US005645248A

United States Patent [19]
Campbell

[11] Patent Number: 5,645,248
[45] Date of Patent: Jul. 8, 1997

[54] LIGHTER THAN AIR SPHERE OR SPHEROID HAVING AN APERTURE AND PATHWAY

[76] Inventor: J. Scott Campbell, 310 W. 106th St., New York, N.Y. 10025

[21] Appl. No.: 288,715

[22] Filed: Aug. 15, 1994

[51] Int. Cl.⁶ .................................................... B64B 1/06
[52] U.S. Cl. ............................ 244/30; 244/96; 244/125
[58] Field of Search .............................. 244/30, 29, 31, 244/125, 96, 97, 25

[56] References Cited

U.S. PATENT DOCUMENTS

| | | |
|---|---|---|
| Re. 28,725 | 2/1976 | Hutchinson et al. . |
| 311,888 | 2/1885 | Falconnet .................... 244/125 |
| 725,981 | 4/1903 | Michelsen . |
| 1,004,662 | 10/1911 | Kuenzel . |
| 1,007,405 | 10/1911 | Wagner ........................ 244/125 |
| 1,023,404 | 4/1912 | Wymore . |
| 1,061,484 | 5/1913 | Lowe . |
| 1,269,547 | 6/1918 | Murray ........................ 244/119 |
| 1,296,687 | 3/1919 | Nichols . |
| 1,308,291 | 7/1919 | McKechner ................. 244/125 |
| 1,390,745 | 9/1921 | Armstrong . |
| 1,766,358 | 6/1930 | Rose . |
| 1,772,161 | 8/1930 | Short . |
| 1,810,762 | 6/1931 | Gisk .............................. 244/119 |
| 1,835,260 | 12/1931 | Barrera . |
| 1,998,380 | 4/1935 | Medoff . |
| 2,038,671 | 4/1936 | Olan . |
| 2,151,336 | 3/1939 | Scharlau . |
| 2,384,893 | 1/1945 | Crook ........................... 244/96 |
| 2,475,786 | 7/1949 | Jordan . |
| 2,858,090 | 10/1958 | Winzen et al. . |
| 2,919,082 | 12/1959 | Winzen et al. . |
| 2,960,282 | 11/1960 | Winzen . |
| 2,996,212 | 8/1961 | O'Sullivan, Jr. . |
| 3,030,500 | 4/1962 | Katzin . |
| 3,045,952 | 7/1962 | Underwood . |
| 3,053,483 | 9/1962 | Stahmer . |
| 3,152,777 | 10/1964 | McLean . |
| 3,174,705 | 3/1965 | Schiff et al . |
| 3,206,749 | 9/1965 | Chatelain |
| 3,232,562 | 2/1966 | Cella . |
| 3,346,216 | 10/1967 | Desmarteau . |
| 3,384,891 | 5/1968 | Anderson . |
| 3,420,473 | 1/1969 | Krafft . |
| 3,450,374 | 6/1969 | Moore . |
| 3,471,856 | 10/1969 | Laughlin, Jr. et al. . |
| 3,620,485 | 11/1971 | Gelhard . |
| 3,742,358 | 6/1973 | Cesaro . |
| 4,032,086 | 6/1977 | Cooke ........................... 244/97 |
| 4,113,206 | 9/1978 | Wheeler . |
| 4,166,596 | 9/1979 | Mouton, Jr. et al. . |
| 4,204,656 | 5/1980 | Seward, III ................... 244/30 |

(List continued on next page.)

FOREIGN PATENT DOCUMENTS

| | | | |
|---|---|---|---|
| 365340 | 11/1929 | Germany ..................... 244/125 |
| 5294288 | 11/1993 | Japan .......................... 244/31 |
| 8754 | of 1914 | United Kingdom ........... 244/125 |
| 2196923 | 5/1988 | United Kingdom ........... 244/125 |

OTHER PUBLICATIONS

Tachibana, T. and Tsukamoto, H., "Aerodyamic Characteristics of a Semibuoyant Station in the Shape of a Torus," 10th American Institute of Aeronautics and Astronautics Lighter–Than–Air Systems Technology Conference, Sep. 14–16, 1993, Scottsdale, Arizona (AIAA–93–4034–CP), pp. 100–103.

"Tech Update—Beachball is Blimp," author unknown, journal unknown, date unknown, part of one page.

*Primary Examiner*—Galen L. Barefoot
*Attorney, Agent, or Firm*—Kilpatrick & Cody, L.L.P.

[57] ABSTRACT

A lighter than air apparatus is provided with a gas impermeable sheeting material having a pathway either extending through the apparatus itself or adjacent to the apparatus. One or more control surfaces are provided proximately to an aperture in the pathway for deflecting air passing through the pathway. A propulsion unit with the pathway propels air through pathway. The pathway, the control surfaces, and the control unit allow the lighter than air apparatus to control its bearing and efficiently maintain its position over the Earth.

3 Claims, 10 Drawing Sheets

U.S. PATENT DOCUMENTS

| | | | |
|---|---|---|---|
| 4,262,864 | 4/1981 | Eshop | 244/96 |
| 4,269,375 | 5/1981 | Hickey . | |
| 4,350,899 | 9/1982 | Benoit . | |
| 4,364,532 | 12/1982 | Stark . | |
| 4,365,772 | 12/1982 | Ferguson . | |
| 4,366,936 | 1/1983 | Ferguson . | |
| 4,387,868 | 6/1983 | Regipa . | |
| 4,534,525 | 8/1985 | Bliamptis . | |
| 4,643,374 | 2/1987 | Friederich | 244/52 |
| 4,685,640 | 8/1987 | Warrington et al. . | |
| 4,754,280 | 6/1988 | Brown et al. | 244/76 R |
| 4,907,382 | 3/1990 | Schwam . | |
| 4,967,983 | 11/1990 | Motts . | |
| 4,986,494 | 1/1991 | Tockert . | |
| 5,005,800 | 4/1991 | Weisse . | |
| 5,069,290 | 12/1991 | Brotz . | |
| 5,071,090 | 12/1991 | Takahashi et al. . | |
| 5,071,383 | 12/1991 | Kinoshita . | |
| 5,104,059 | 4/1992 | Rand et al. . | |
| 5,115,997 | 5/1992 | Peterson . | |
| 5,115,998 | 5/1992 | Olive . | |
| 5,118,558 | 6/1992 | Mater et al. . | |
| 5,348,254 | 9/1994 | Nakada | 244/61 |

LIGHTER THAN AIR SPHERE OR SPHEROID HAVING AN APERTURE AND PATHWAY

BACKGROUND OF THE INVENTION

The present invention relates to a lighter than air apparatus which can be controlled and maneuvered while in flight, and more particularly to a lighter than air apparatus having an opening or pathway for the controlling of the orientation and position of the apparatus with respect to the Earth.

Various different types of lighter than air (hereinafter "LTA") devices have been in existence for some time. In a first group of these devices, such as hot-air balloons, little or no control of the position of the LTA device exists with respect to the Earth while in flight. For these types of devices, the position of the LTA device relative to Earth depends on wind and weather in existence during flight.

In a second group of LTA devices, self-propulsion is provided (e.g., in a blimp) which allows the device to oppose the forces of wind and weather to maintain its position over the Earth. For these types of devices, the expense of energy to maintain the position of the LTA device with respect to Earth makes them inefficient as a means for doing so.

Other such LTA devices are known which can be maneuvered and steered to control their relative position with respect to the Earth. For example, a LTA device can have an engine tube which permits air flow through the LTA device. A ramjet engine can then be disposed in the engine tube for propelling the LTA device.

In a known spherical, superpressure balloon made of a non-elastic material, a rigid, load-supporting yoke is provided. The aircraft is propelled and steered through the air via gas turbine engines coupled to the yoke. Additional lift is provided by rotating the balloon according to the Magnus effect.

ALTA device having a geodesic frame covered with a pliable, air-tight envelope is known where the contents of the device are evacuated to make the device lighter than air and buoyant. However, in such a device, no means are provided for maneuvering or controlling the position of the device.

In a known airship comprising a gas-containing annulus supporting a framework, propulsion devices are coupled to the framework for lifting and maneuvering the ship. Similarly, an annular buoyant body exists having propellers for lifting and maneuvering the body through the air. Also, in a known annular balloon, two outer layers are provided for storage of lighter-than-air gases. Upon filling of these storage areas, a north-to-south pole annulus is formed which is used to store various articles to be used in mid-air or space.

In many known dirigibles and airships, one or more pathways are provided through which air is allowed to flow. The pathways in these airships are also relatively long, which tends to cause excessive drag. For example, in these known dirigibles and airships, the length of the pathway is more than three times the diameter of the airship. Also, the ratio of the surface area of the airship to its volume is inefficient for maximizing lift from a given volume of LTA gas.

There are several other drawbacks of the aforementioned airships and dirigibles. First of all, since all of these airships are prolate in design, each has a large surface area which is presented to crosswinds. Changing crosswinds makes it difficult to control the airship's direction (bearing) and its position above and relative to the Earth. The difficulty in controlling the bearing of the airship is most acute during landing and mooring of the airship.

There is a need for a LTA apparatus which is easily and efficiently maneuvered even in windy conditions. There is also a need for a LTA apparatus whose position over and relative to the Earth can be precisely maintained with maximum efficiency.

SUMMARY OF THE INVENTION

These and other needs are met by the LTA apparatus of the present invention. The lighter than air apparatus can have a substantially spherical shape and is provided with a gas impermeable sheeting material having a pathway either extending through the apparatus itself or adjacent to the apparatus. When the pathway extends through the apparatus, it has a length which is no less than half the largest diameter of the apparatus. One or more control surfaces are provided proximately to an aperture in the pathway for deflecting air passing through the pathway. A propulsion unit within the pathway propels air through pathway. The pathway, the control surfaces, and the control unit allow the lighter than air apparatus to control its bearing and efficiently maintain its position over the Earth.

A framework, such as a geodesic framework, is provided comprising a plurality of rigid struts supporting the control surface and the propulsion unit. Each of the struts has a hole in a distal end of the strut which is inserted into a connector ring, and a flexible cable is inserted through the holes to lock the struts to the connector.

An actuator can be placed between two ends of a strut to lengthen and shorten an individual strut. Alternatively, a screw mechanism can be placed at a connector to move the connector and thus deform the framework. In doing so, the attitude of the apparatus in the wind can be controlled without control surfaces.

A first ballonet can be placed inside the apparatus and filled with a lighter than air gas for buoyancy. Therefore, the sheeting material need not be made of a gas impermeable material. A second ballonet can be placed inside the apparatus that contains air or other relatively heavy gas. As the lighter than air apparatus rises, the heavy gas can be purged which controls the pressure within the apparatus. Also, heavy gas can be pumped into and out of the second ballonet to control the altitude of the apparatus.

A servo motor is coupled to a rod extending through one of the control surfaces. The servo motor, which can be remotely controlled, controls the deflection of the control surface. A video camera can be provided to send aerial pictures to a remote operator. A Global Positioning System device coupled to the lighter than air apparatus can provide a position indication to a computer or a remote operator.

A ballast tank is provided with a pump which moves liquid to and from the ballast tank to change the center of gravity of the lighter than air apparatus. Fuel for the propulsion unit can be used as fluid in this ballast system.

A plurality of photovoltaic panels coupled to the lighter than air apparatus can generate electricity or electric power for the components on the apparatus or for users on the ground. The photovoltaic cells can also convert water in the apparatus into hydrogen and oxygen, where the hydrogen is used to maintain buoyancy.

A passenger carrying compartment can be coupled to the apparatus to transport persons or cargo. The apparatus can also be tethered to the Earth. If the tether comprises wire, electric signals or electric power can be transmitted to and from the apparatus.

A station keeping system coupled within the apparatus controls the control surfaces and propulsion units to maintain the apparatus' position relative to the Earth. The GPS devices mentioned above along with an altimeter, weather vane, a compass, and anemometers (one outside the apparatus and one inside the pathway) can be used as feedback to the system to maintain the apparatus' position.

DETAILED DESCRIPTION

Figure 1:
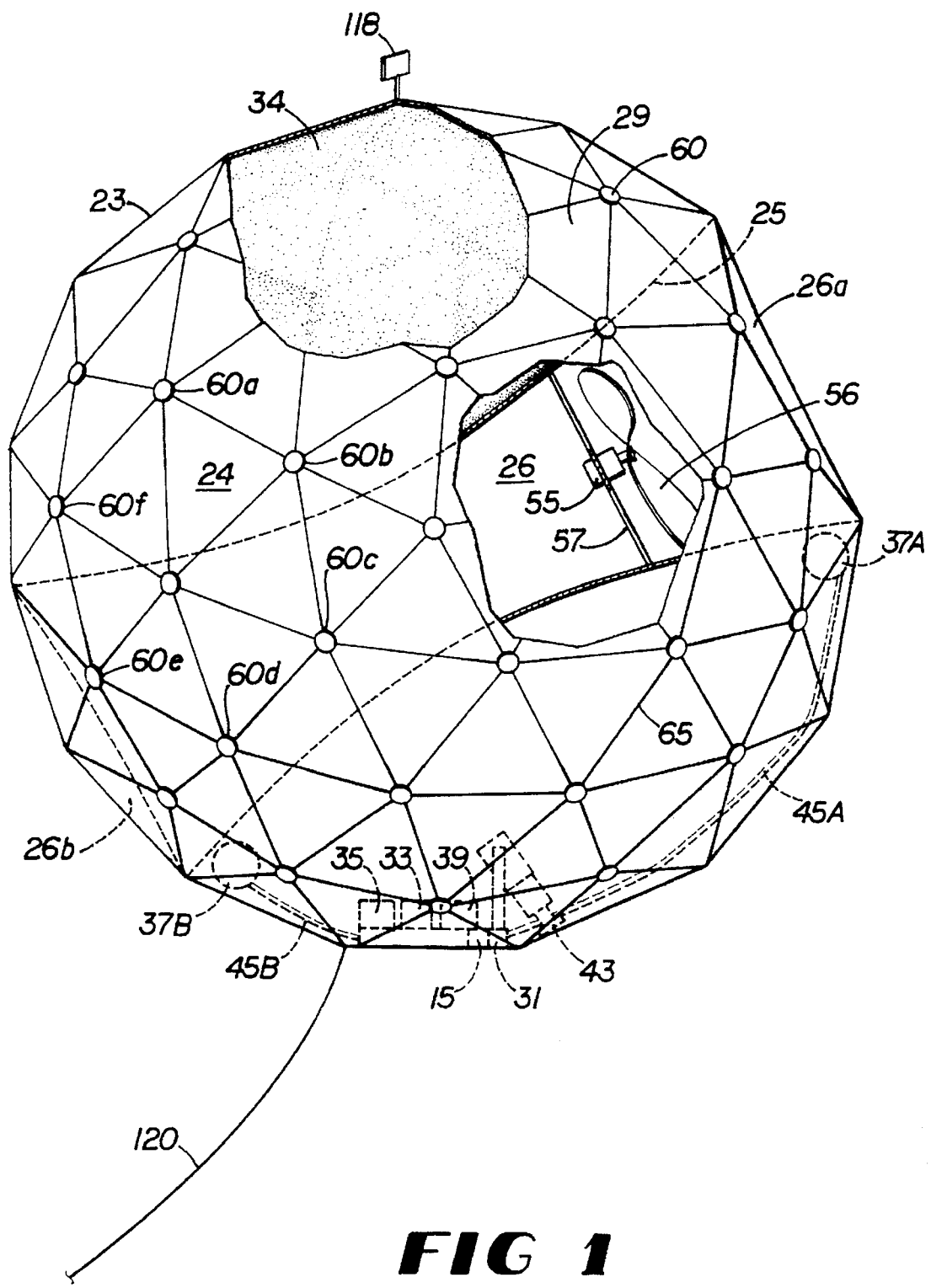
FIG. 1 is a schematic diagram of a LTA apparatus constructed according to the present invention.

Referring to FIG. 1, a schematic diagram of a LTA apparatus 1 of the present invention is shown. In this embodiment, the LTA apparatus 1 comprises a geodesic spheroid framework having a number of struts (e.g., strut 65). Each strut 65 is coupled between two connectors (e.g., connector 60). The coupling between a strut 65 and a connector 60 is described in more detail below with reference to FIG. 4. In this embodiment, the struts 65 and connectors 60 are constructed as a 3 frequency icosahedron geodesic framework 23. However, it should be readily appreciated by one skilled in the art that many other spherical or spheroidal geodesic patterns are available to achieve a similar LTA apparatus.

Each strut can be made of tubular carbon composite made with ProSpar™ manufactured by Glassforms Industries of California. In this icosahedron geodesic framework of the present embodiment, there are three different lengths for the struts 65 (each approximately 32 inches in length and approximately ¾ inch in width). Each strut 65 can be made of any of a variety of materials including aluminum, graphite composite, plastic composite, a Kevlar® composite, boron composite, bamboo, etc. The tensile strength of the carbon composite strut is 210,000 p.s.i.

The geodesic structure 23 can support a flexible gas impermeable sheeting material 29 which can be, but is not limited to, Mylar® (manufactured by E. I. DuPont de Nemours & Co.), a biaxial nylon film (such as one made by Allied Chemical), or a polypropelene film. It will be appreciated by one skilled in the art that gas impermeable sheeting material can be attached inside of the geodesic framework 23 rather than outside. The gas impermeable sheeting material 29 can be attached to the geodesic framework 23 by an adhesive tape, such as 3M Clearview packaging tape. The tape is applied from the outside of the apparatus over a strut 65 and sealed onto the sheeting material 29. Panels (e.g., panel 24) of the gas impermeable sheeting material 29 can also be sealed together on the inside of the geodesic framework 23 with tape. Other joining means may be used.

Figure 17:
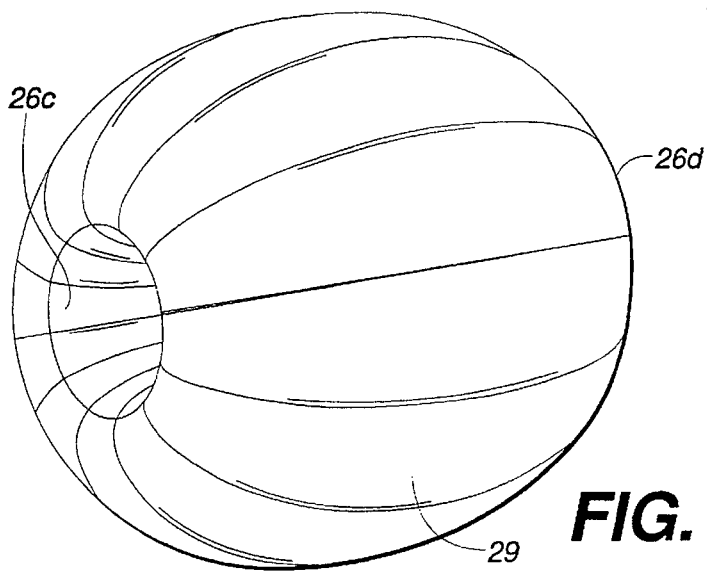
FIG. 17 is a drawing of LTA apparatus comprising "banana" shaped gores.

In this embodiment, the gas impermeable sheeting material 29 does not extend over the entire surface area of the geodesic framework 23. Hexagonal apertures 26a, 26b appears at opposite ends (i.e., poles) of the geodesic framework. As seen in the icosahedron design of FIG. 1, every three struts 65 forms a triangular panel (e.g., panel 24) which can be one-fifth of a pentagon defined by five connectors 60 or one-sixth of a hexagon defined by six connectors (e.g., connectors 60a–60f). Accordingly, in this embodiment, each aperture 26a, 26b in the surface of the gas impermeable sheeting material 29 of the geodesic framework 23 has the same area as the hexagon defined by connectors 60a–60f. One skilled in the art will appreciate that shapes other than a triangle can be employed to make the skin of the LTA apparatus. For example, gores (having a "banana" shape) can be used in constructing the LTA apparatus. Referring to FIG. 17, gores are shown having a "banana" shape can be used in assembling the sheeting material 29 within the geodesic framework 23 of the LTA apparatus. In FIG. 17, the sheeting material 29 has been assembled to form a rounded shape having apertures 26c and 26d which correspond to apertures 26a and 26b in FIG. 1.

Figure 8:
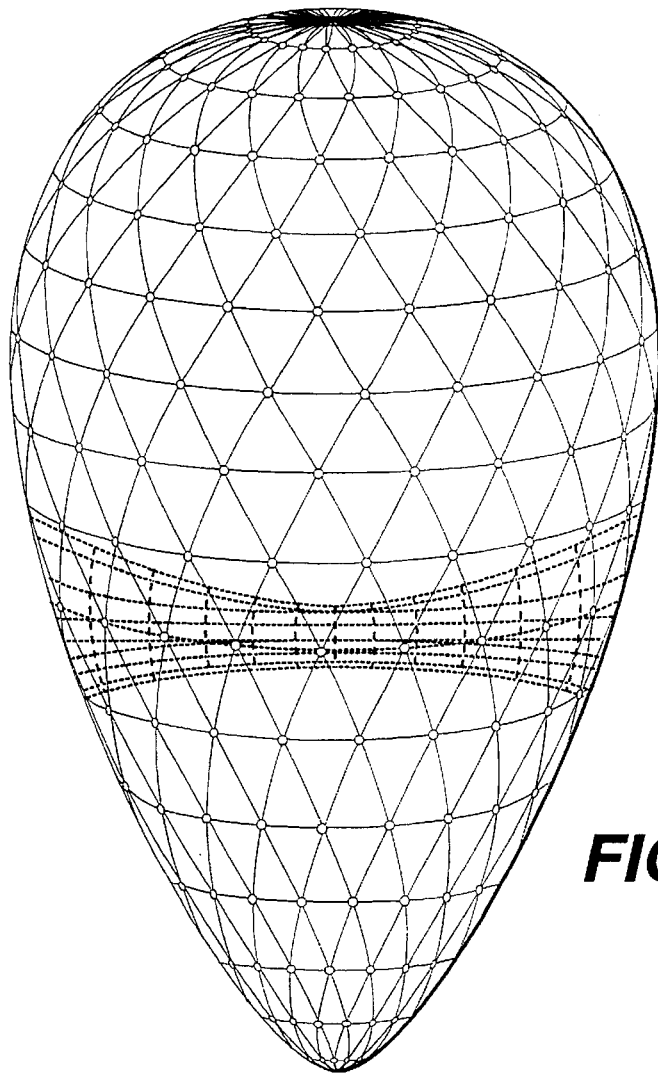
FIG. 8 shows an embodiment of the LTA apparatus where the geodesic shape has as egg shape.

A hexagonal, fluid pathway 25 appears within the geodesic structure 23 and couples the two apertures 26a, 26b in the gas impermeable skin 29. The fluid pathway covering 26 may be of a hexagonal cross-section, as shown, or of any cross-sectional geometry that permits the unobstructed flow of fluid. The central axis of the pathway 25 corresponds to a diameter of the geodesic framework 23. The pathway 25 can be made from ripstop nylon fabric or any of a variety of other flexible or inflexible materials. As with the gas impermeable skin 29, the pathway 25 is attached to the geodesic frame 23 with an adhesive tape. The dimensions of the LTA apparatus 1 and the pathway 25 are such that the largest diameter of the LTA apparatus is no greater than two times the length of the pathway 25. In doing so there is much less drag on the apparatus as a whole, and the efficiency that is gained be having the pathway is not lost due to excessive drag. As seen in FIG. 8, the LTA apparatus can have other shapes which follow this diameter-to-length ratio.

Figure 2:
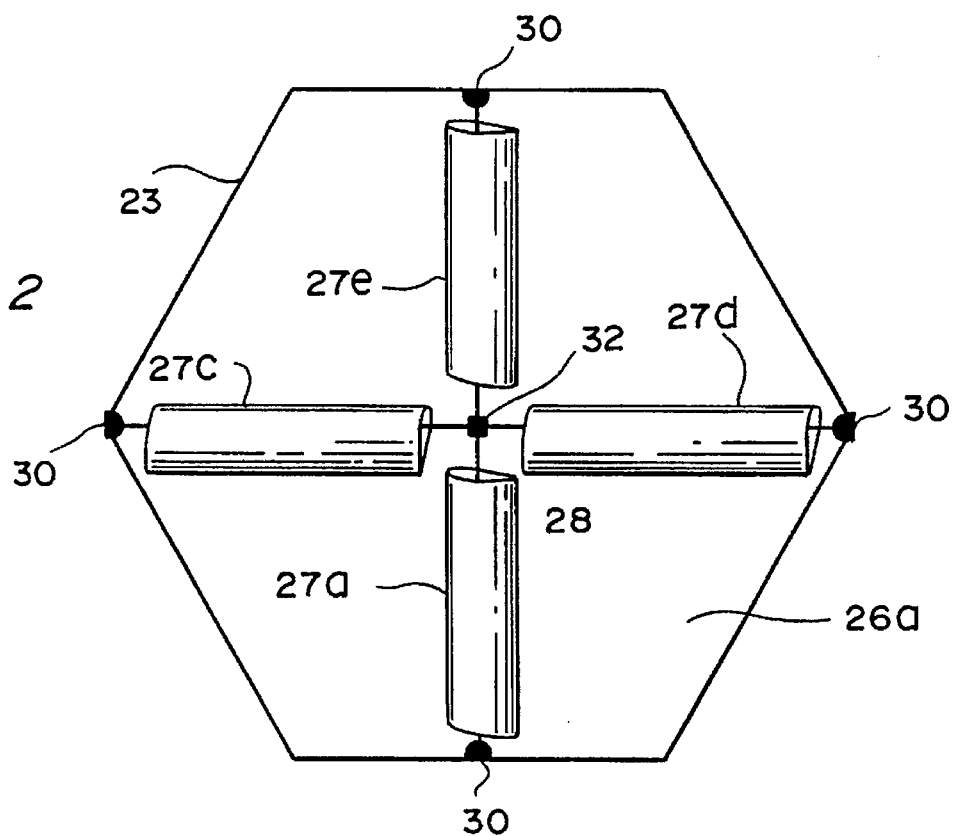
FIG. 2 is a schematic drawing of control surfaces disposed in an aperture of a LTA apparatus according to the present invention.

Referring to FIG. 2, one or more airfoils or control surfaces 27a, 27b, 27c, 27d are coupled to the geodesic framework 23 of the LTA apparatus at an aperture. Alternatively, the control surfaces 27a–27d can be coupled inside the pathway 25 (FIG. 1). As seen in FIG. 2, a series of four control surfaces 27a–27d are shown in a hexagonal aperture 26a. The formation of the four control surfaces 27a–27d is also known as a "cruciform" configuration. It will be readily apparent to one skilled in the art that other configurations of the control surfaces can be used (e.g., a "Y-form" configuration which has less drag than the cruciform configuration). A rod (e.g., rod 28) extends through each pair/set of control surfaces (e.g., 27a–27b) and bearing 32 and is coupled at least at one end to a servo motor 30 which is attached to the geodesic framework 23. In this embodiment, the control surfaces 27a–27d are made using a foam core covered with a thin layer of epoxy (similar to the wings of radio control hobby planes). A radio controlled servo motor 30, such as the one manufactured by Airtronics, Inc. of California is coupled to at least one end of a rod 28 in order to control the deflection of the control surfaces 27a–27b. In this embodiment, the servo motor 30 is a standard type 50 ounce-inch torque servo motor.

The volume between the gas impermeable skin 29 and the pathway 25 is filled with a lighter than air gas or combination of gases such as helium, hydrogen, hot air, etc. to make the LTA apparatus a desired buoyancy (see FIG. 1). As air (i.e., wind) impinges upon the pathway 25, air flows through the pathway into the control surfaces (e.g., control surfaces 27a, 27b) at the aperture 26a. By controlling the deflection of the control surfaces, the attitude and bearing of the LTA apparatus can be controlled.

Figure 3A:
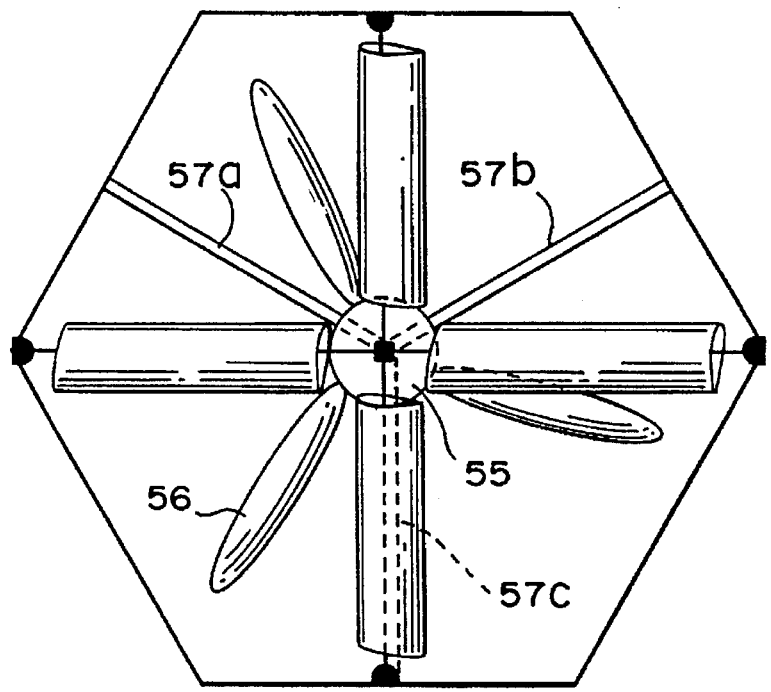
FIGS. 3A and 3B are schematic drawings showing the mounting of a propulsion unit inside the LTA apparatus of FIG. 1.
Figure 3B:
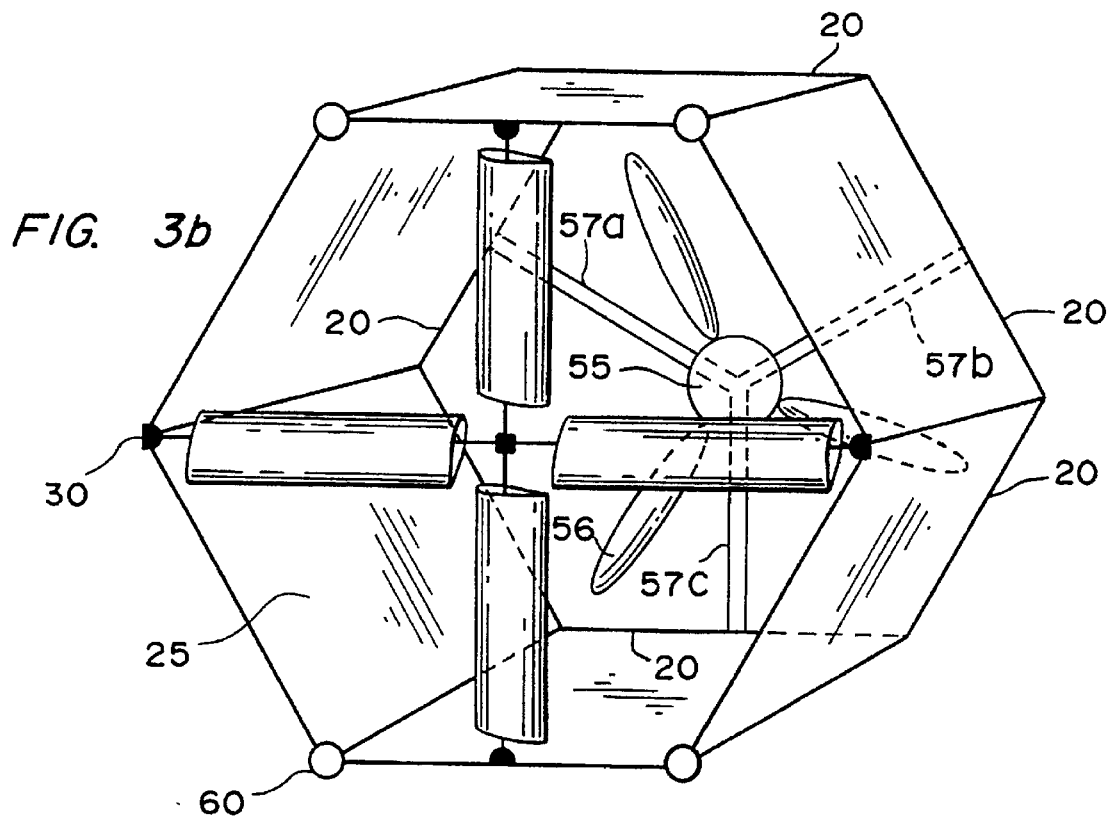

Referring to FIGS. 3A and 3B, the installation of a propulsion unit (e.g., propulsion unit 55) within the pathway 25 is shown. FIG. 3A shows a propulsion unit 55 installed having a propeller 56 and mounts 57a, 57b, 57c. The propulsion unit 55 can be a Plettenberg Hektoplett type PL355/40/6 motor. The mounts 57a–57c are made of a high-strength, low-weight material such as a carbon, boron, or Kevlar® composite. In this embodiment, as shown in FIG. 3b, the mounts 57a–57c are connected to a hexagonal framework of struts 20 that are connected to the geodesic frame 23. The hexagonal framework of struts 20 is inserted inside the pathway 25 on the interior side of the pathway material. The propulsion unit 55 is coupled in the center of the pathway 25 to the mounts 57a–57c, advantageously placed near an aperture (e.g., aperture 26a) and one or more control surfaces (e.g., control surfaces 27a, 27b) so that the thrust of the propulsion unit impinges upon the control surfaces. The LTA apparatus 1 is propelled and directed using the remotely controlled propulsion unit 55, the pathway 25, and the control surfaces 27a–27d.

As shown in FIG. 1, a plurality of components are coupled within or to the LTA apparatus 1. For example, a power source 31 can be located in the geodesic framework 23, coupled to one or more struts 65 or connectors 60. In this embodiment, the power source 31 is realized as nickel-cadmium (hi-cad) batteries such as 5000 milliampere hour series from SR Batteries of New York. A microprocessor and radio control electronics such as a radio control FM receiver like an Interceptor 2000 manufactured by DAD Electronics of California, a proportional motor speed controller such as a MA-6 speed controller manufactured by Airtronics, Inc. of California, an audio television transmitter such as the 2 Watt ATV model manufacture by Supercircuits of California and aircraft recovery radio beacon such as one manufactured by Kastner Electronic of Wisconsin are housed in electronics compartment 33.

Figure 11A:
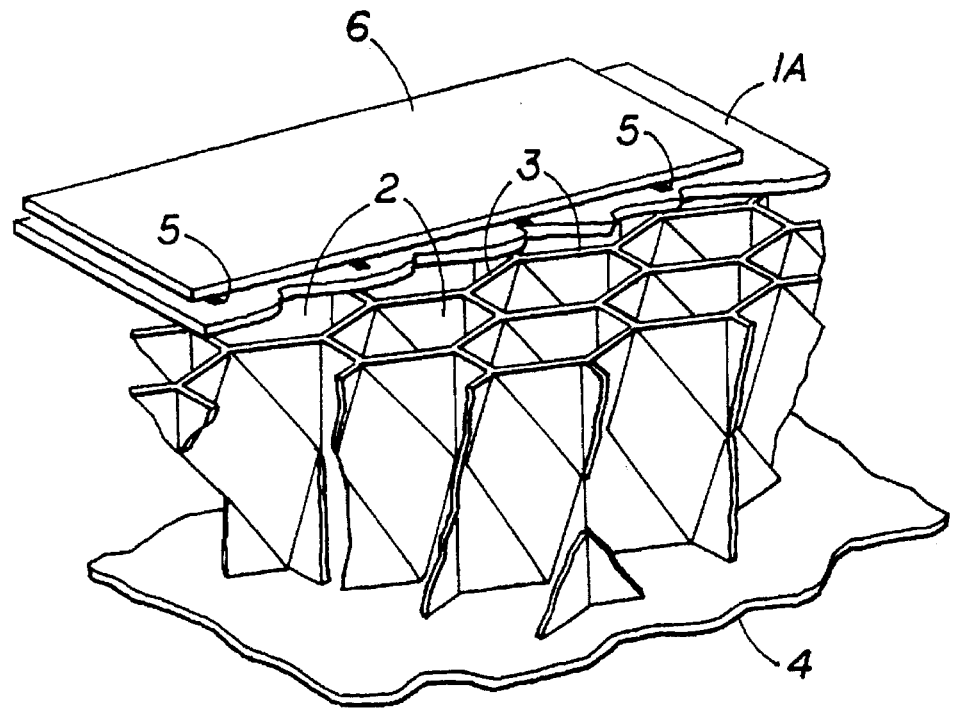
FIGS. 11A and 11B show a top cross-section of an embodiment of the present invention using GPS electronics.
Figure 11B:
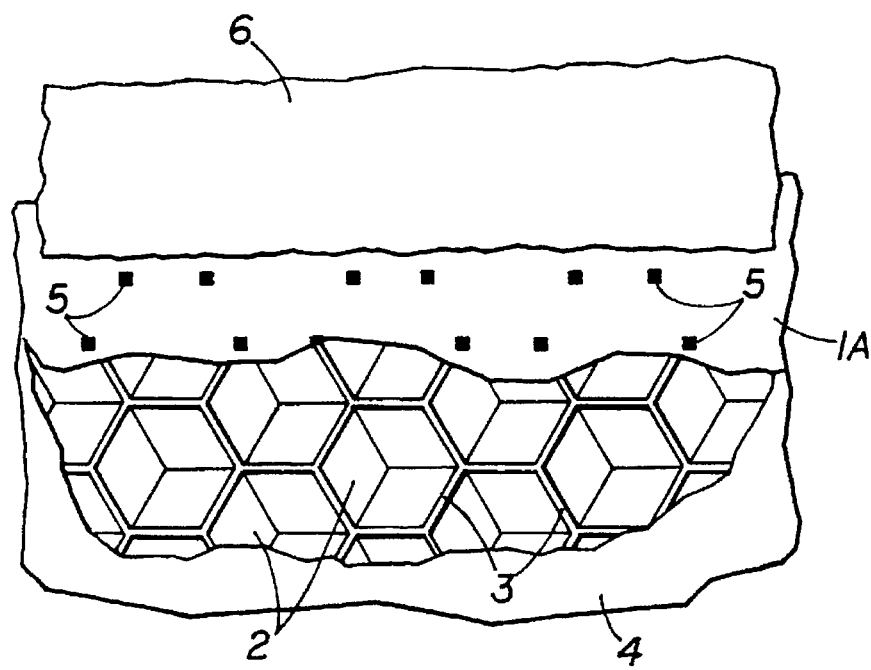

A variety of other components can be coupled to the geodesic structure such as communications and optical equipment (e.g., transmitters and receivers, a camera 43, such as a PC-3 monochrome CCD video camera manufactured by Supercircuits of California, and/or Global Positioning System (GPS) electronics). As seen in FIGS. 11A and 11B, a LTA apparatus 1 is shown where 3 GPS devices 46a, 46b, 46c (e.g., Motorola VP Oncore devices) are positioned equidistant about the geodesic framework 23, but not interfering with pathway 26, to more precisely determine the location of the LTA apparatus 1 and to provide redundancy in case of failure. The digital camera 43 can be used by a remote operator to guide the flying LTA apparatus and also to relay aerial pictures back to Earth.

In addition to the devices mentioned above for controlling the attitude and propulsion of the LTA apparatus 1, a fluid ballast system is also provided. One or more ballast tanks (e.g., ballast tanks 37A, 37B) are coupled to the geodesic framework 23. In this embodiment of the present invention, a pump 39 such as a VP-30 pump manufactured by Varsane Products of California is coupled to the ballast tanks 37A, 37B. These ballast tanks are flexible vinyl plastic bladder type tanks and are coupled to the geodesic framework 23 with epoxy adhesive. Hoses 45A, 45B, are coupled to the tanks 37A, 37B, respectively, via pump 39. Pump 39 is used to move liquid between the ballast tanks 37A, 37B to change the center of gravity which changes the attitude to the wind of the apertures 26a, 26b of the LTA apparatus 1. The most effective placement of the ballast tanks is 180 degrees apart in the LTA apparatus in a line parallel to the axis of the pathway 25. Furthermore, fuel for the propulsion unit 55 can also be used as the liquid ballast. A servo motor driven valve 15 may also be attached to pump 39 for the purpose of releasing liquid ballast away from the LTA apparatus to offset lost LTA gases or to increase the altitude of the apparatus. Many of the aforementioned components can also be incorporated into the framework 23 and/or sheeting material 29 of the LTA apparatus to more evenly distribute the stress and weight of these components.

Figure 4:
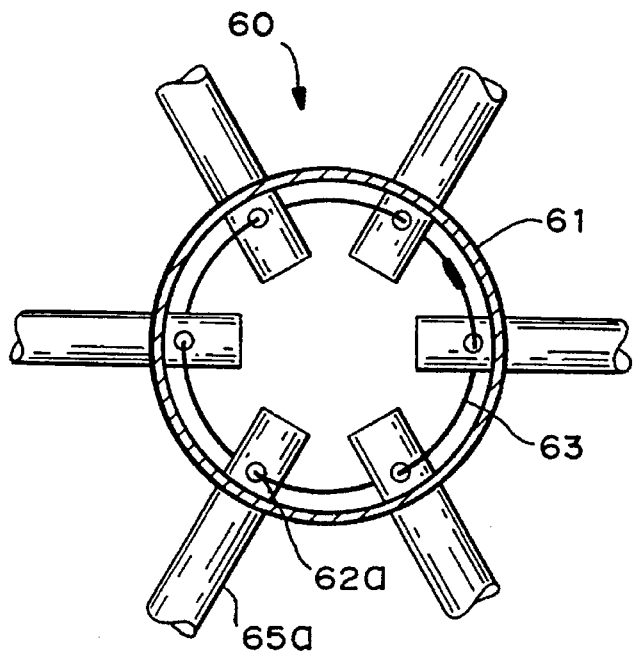
FIG. 4 is a schematic drawing of a connector of the LTA apparatus of FIG. 1.

Referring to FIG. 4, a connector 60 assembly is shown. A connector ring 61 is provided made of a light-weight, high-strength slice of tubing material such as aircraft grade aluminum alloy, Kevlar® plastic, or a carbon composite (e.g., ProSpar™ carbon composite manufactured by Glassforms Industries). Each strut (e.g., strut 65a) has a hole 62a proximately to each of its distal ends. In this embodiment, there are both six hole (hex) and five hole (pent) connector assemblies. FIG. 4 shows a six hole connector 60 which differs from a five hole connector by having an additional hole. In a 3 frequency icosahedron there are 80 hex connectors and 12 pent connectors. FIG. 4 shows how six struts 65 are inserted into connector ring 61 such that the hole 62a for each strut's distal end is also inserted into the connector ring 61. A flexible cable 63 is inserted through all of the holes 62a of the struts 65 inside of the connector ring 61 to secure them therein. The flexible cable can be made of a 0.080 mm monofilament nylon cable (similar to the flexible component of a so called "weed whacker" device).

The operation of the LTA apparatus will be further explained with references to FIGS. 1–3B. As described above, the apparatus is prepared for flying by inflating the gas impermeable sheeting material 29 with helium or other lighter than air gas until the apparatus reaches a desired buoyancy. In a remote-controlled embodiment, using radio controlled transmitters and receivers that are in present use (not shown), a signal is sent to the radio controlled electronics 33 in the LTA apparatus 1 to turn on the propulsion unit(s) 55. Thrust created in the pathway 25 is directed by the control surfaces 27a–27d to push and pull the apparatus upward. Once the apparatus has reached a deployment altitude, the air ballast pump 35 is used to pump air into a ballonet 34 within the LTA apparatus. Control surfaces 27a–27d in this embodiment are used to control the bearing, attitude, and altitude of the apparatus and to direct the apparatus into or out of prevailing wind. The digital camera 43 is used to guide the operator and also to relay aerial pictures back to the ground.

Figure 18:
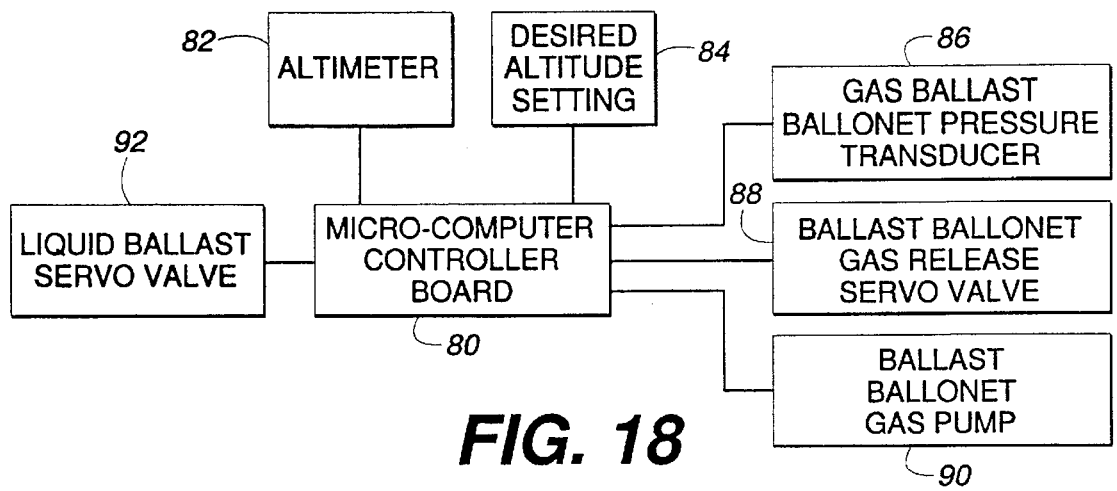
FIG. 18 is a block diagram of a micro-controller for achieving and maintaining the position and altitude of the LTA apparatus of FIG. 1.
Figure 19:
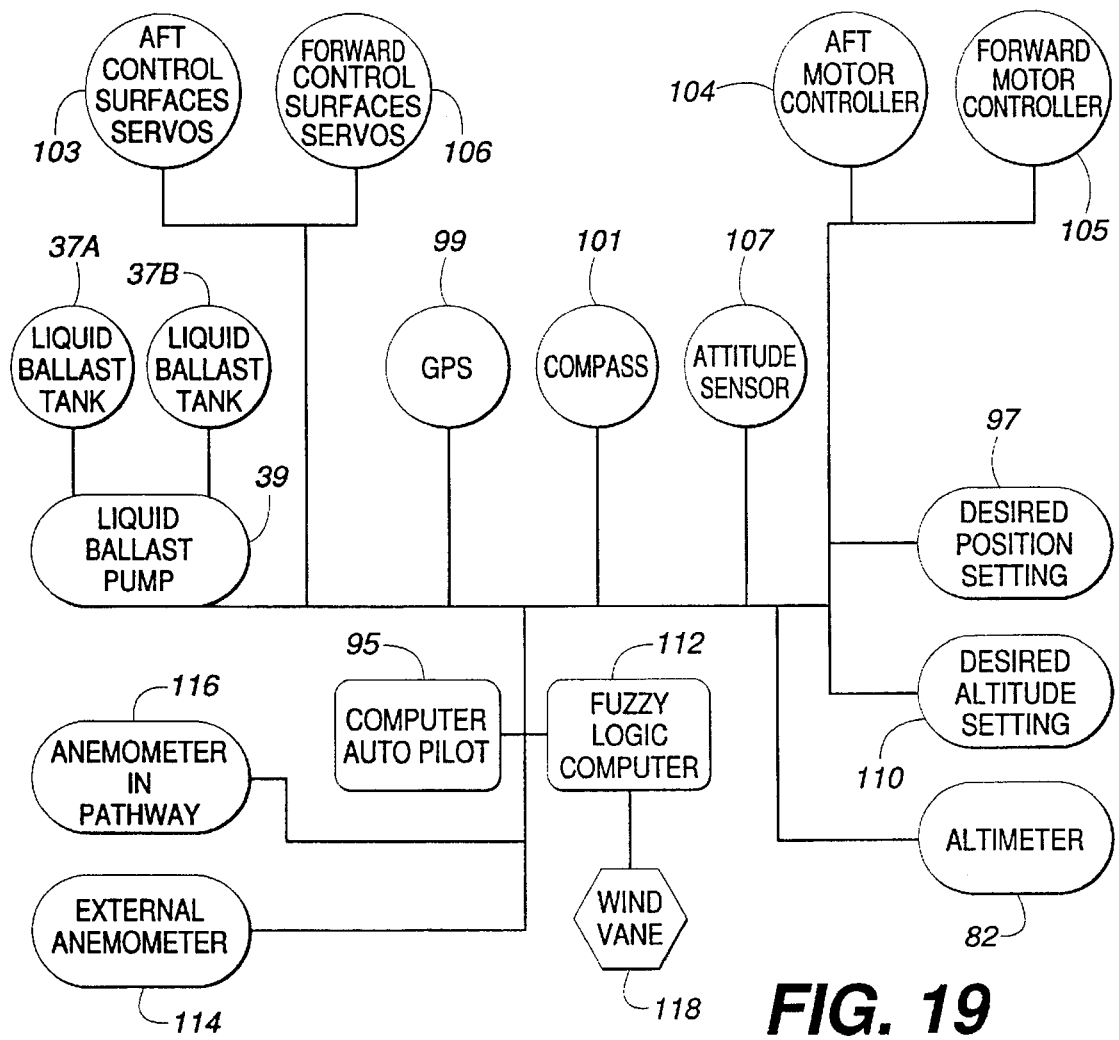
FIG. 19 is a block diagram of a system using the micro-controller of FIG. 18.

A system is provided for achieving and maintaining a desired altitude and position of the LTA apparatus is shown in FIGS. 18 and 19. A micro-controller board 80 is coupled to a plurality of input devices and controls several different electromechanical devices. The desired altitude setting 84 (e.g., a numerical altitude value stored in a memory device) is either preset or radio-controlled from a remote source. Microcontroller 80 reads the desired altitude setting 84 and compares it to the reading from electronic altimeter 82. Depending on the difference between the readings, microcontroller 80 determines by algorithms known to those familiar in the art of fuzzy logic whether to increase or decrease the pressure in the ballast ballonet 34 (FIG. 1) as measured by a gas pressure transducer 86 coupled to the ballonet 34. Increasing the ballonet gas pressure is done via a ballast gas pump 90 which decreases the lift of the LTA apparatus. Decreasing the ballonet gas pressure is done via a gas release servo valve 88 which increases the lift of the LTA apparatus. If the LTA apparatus is losing altitude faster than the gas ballast ballonet can release gas ballast, then the micro-controller 80 causes liquid ballast to be released through liquid ballast servo valve 15 (See FIG. 1). Liquid ballast is also released if the pressure reading from the gas pressure transducer drops below a predetermined threshold.

Referring to FIG. 19, the system for achieving and maintaining position and altitude is shown. The system comprises an onboard computer, typically referred to those skilled in the art as an autopilot 95 which monitors inputs from a variety of instruments and sends control signals out to the control surfaces and motors of the LTA apparatus.

There are essentially two modes of operation of the station keeping system shown in FIG. 19. In the first mode of operation, the station keeping system pilots the LTA apparatus to the desired latitude and longitude relative to the Earth. Conventional computer autopilots such as those found in commercial and private aviation can be employed to pilot the LTA apparatus to a desired position (as indicated on desired position setting 97, which can be a numerical value stored in a memory device) relative to the Earth. The desired position setting 97 is compared with current position as supplied by the known GPS system 99. Autopilot 95 checks the heading of the LTA apparatus with an electronic compass 101 and determines the course and sends control signals to aft control surface servos 103, forward control surface servos 106 (which control the control surfaces, e.g., 27a–d), and aft motor controller 104 and forward motor controller 105 (which control separate motors 55 in the LTA apparatus). Concurrently, computer autopilot 95 checks the altimeter 82 and desired altitude setting 110. Depending on whether the difference between the readings is positive or negative, the computer autopilot 95 adjusts aft and forward control surface servos 103, 106 to change the attitude of the LTA apparatus in order to ascend or descend to the desired altitude while heading the LTA apparatus to the desired position setting 97. Concurrently or alternatively, the computer autopilot 95 may change the attitude of the LTA apparatus by signaling liquid ballast pump 39 to shift liquid ballast between liquid ballast tanks 43, 45 respectively. Changing the attitude of the LTA apparatus with respect to the Earth while being propelled is another way to influence the ascent or descent of the LTA apparatus.

Departing from the use of standard aviation computer autopilots, a fuzzy logic computer 112 ("FLC") such as the one developed and manufactured by Omron Electronics of Japan is employed to determine the most efficient heading to achieve a desired position. This is done by checking several instrument readings simultaneously and then instructing the computer autopilot 95 to make minor changes to the deflection of the control surfaces and speed of the motors and then rechecking the instrument readings. While the computer autopilot 95 is piloting the LTA apparatus towards a desire position setting 97, FLC 112 is simultaneously checking and making corrections for efficiency. This is meant as a check and balance system. While commercial aviation autopilots for airplanes always try to maintain a straight line to a desired position, such a system is not necessarily the most efficient for the present invention. In many cases it is more efficient for a LTA apparatus to tack back and forth to a desired position 97 like a sailboat would do rather than fly a straight line. FLC 112 checks the wind velocity from external anemometer 114 against the wind velocity of the anemometer in the pathway 116. This differential is weighted against the readings from motor speeds of aft and forward motors 104, 105 and the position of wind vane 118 which is positioned 180° opposed to the power source on the LTA apparatus (as seen in FIG. 1). FLC 112 signals the computer autopilot 95 to make a discrete change in the aft and forward control surface servos 103, 106. FLC 112 repeats the above sequence and determines whether there has been an increase in efficiency with regard to external wind velocity as read by anemometer 114 and internal wind velocity as read by anemometer 116, with regard to motor speeds and wind vane 118.

Once the LTA apparatus has reached the desired position, the second mode of operation of the station keeping system takes over. Once the desired position setting 97 matches the readings from GPS devices 99, liquid ballast pump 39 is signalled to pump ballast between liquid ballast tanks 37a, 37b until attitude sensor 107 signals a horizontal attitude of the pathway with respect to the Earth. The key to efficient station keeping of the LTA apparatus is to keep the pathway directed into the wind while increasing or decreasing the speeds of the aft and forward motors via controllers 104, 105. Wind vane 118 comprises an aerodynamically shaped rigid surface and is attached at the base to a variable potentiometer. The wind vane 118 is set to zero when parallel to the pathway. FLC 112 constantly monitors position readings via GPS 99, wind speed via anemometer 114, wind direction via wind vane 118 and send corrective control signals to aft and forward control servos 103, 106 and aft and forward motor controllers 104, 105 to maintain position relative to the Earth.

The above is an exemplary embodiment of the present invention. Several modifications can be made to the exemplary embodiment according to the present invention. For example, the cross-sectional shape of the pathway 25 can be of any geometry design such as a square, triangle, or other polygon, or a circle, or other curvilinear design.

Figure 5:
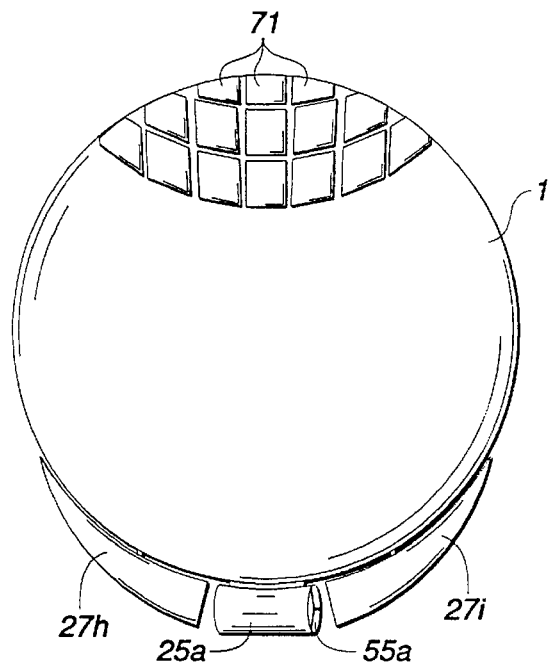
FIG. 5 is a schematic drawing of a LTA apparatus having a pathway attached adjacent to its geodesic structure.
Figure 6:
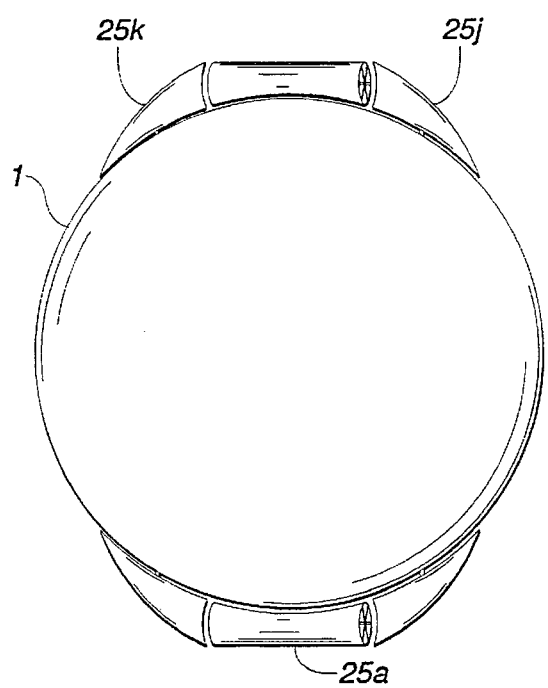
FIG. 6 is the LTA apparatus of FIG. 5 having an additional pathway attached to the geodesic structure.
Figure 7:
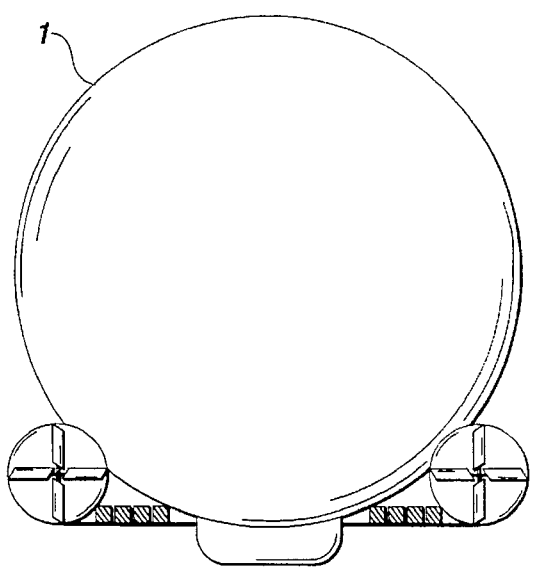
FIG. 7 is a schematic drawing of a LTA apparatus having two pathways coupled to its bottom.

The pathway 25 need not necessarily pass through the LTA apparatus. Referring to FIG. 5, the pathway 25a is attached to the exterior of the geodesic structure of the LTA apparatus. One or more control surfaces (e.g., airfoils 27h, 27i) are coupled proximately to the openings of the pathway 25a. As with the LTA apparatus of FIG. 1, a propulsion unit 55a is placed within the pathway 25a for maneuvering and lifting the LTA apparatus. As seen in FIGS. 6 and 7, additional pathways and control surfaces can be added to the LTA apparatus, as desired, for additional control (e.g., second pathway 25b, second propulsion unit 55b, and additional airfoils 25j, 25k in FIG. 6).

Figure 12:
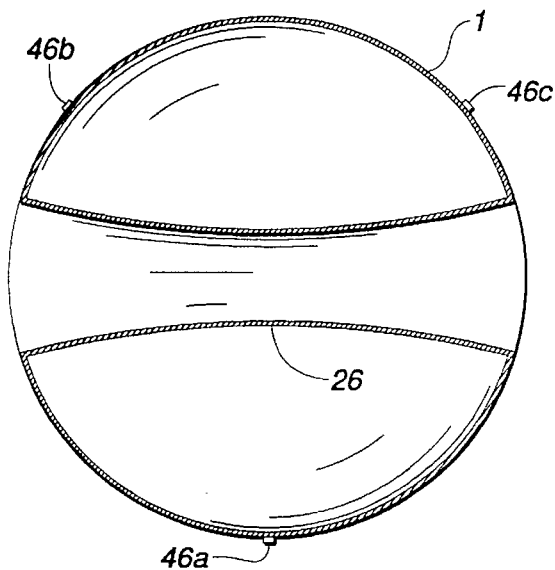
FIG. 12 is a schematic drawing showing a heavier-than-air gas pump and servo valves.

In a further embodiment seen in FIG. 1, a separate compartment or ballonet 34 within the LTA apparatus houses air or heavier-than-air gas which can be either purged from or pumped into the ballonet 34. Ballonet 34 is inflated or deflated by remote or automatically controlled pumps and servo actuated valves (e.g., ballonet pump assembly 35). Inflation or deflation of the ballonet 34 provides a degree of controllable ballast for changing altitudes of the LTA apparatus. As seen in FIG. 12, the ballonet pump assembly 35 is coupled to the ballonet 34 and comprises a pump 35a which can be a 6 volt Gilian pump with 6 liter/minute capacity. The pump 35a is coupled to two Klippard valve actuators 36a, 36b, which are controlled by a servo motor 38 which drives arm 40. Valve 36a controls the intake of ballast gas, and valve 36b is for purging this ballast gas.

Alternatively, one or more ballonets 34 can be filled with a LTA gas to provide a desired buoyancy to the LTA apparatus 1. Since the ballonets 34 within the LTA apparatus 1 provide the necessary buoyancy, the sheeting material 29 need not be gas impermeable. In this example, the sheeting material 29 can be made of a gas permeable, light-weight, high-strength fabric such as Spectra manufactured by Clark-Schwebel of Anderson, S.C.

The control surfaces of the present invention can be designed in any of a variety of ways. For example, a control surface can be constructed in a louver-like design housed in a 360 degree rotatable ring. Another design for the control surfaces is elongated triangular panels that follow the contour of the LTA apparatus (see control surfaces 25j, 25k of FIG. 6) with a control surface fore and aft of the pathway.

Figure 9:
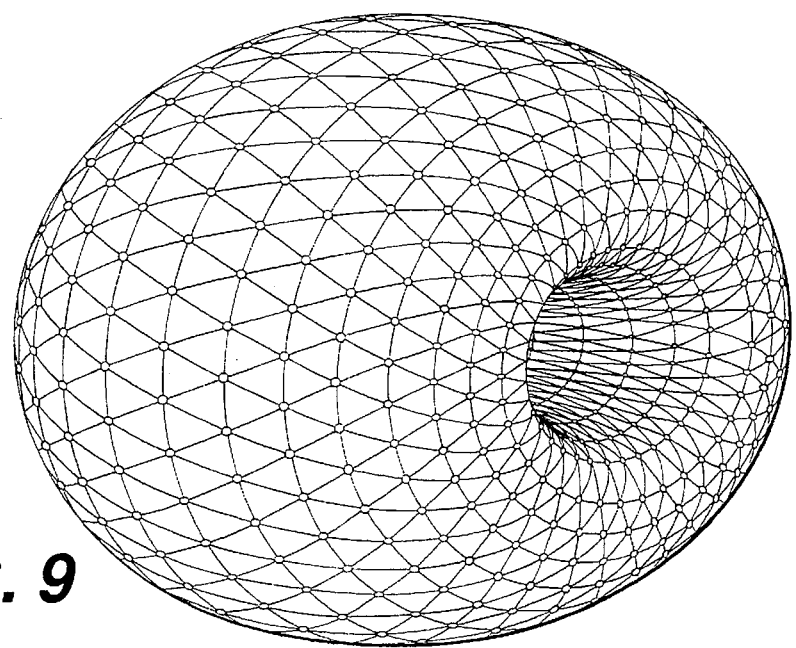
FIG. 9 is a portion of a LTA apparatus using Kevlar® cable for support rather than a rigid material such as a carbon composite.

The framework 23 of the LTA apparatus 1 need not be made of a rigid material (e.g., a carbon composite), but rather, can be made of cord or line, such as Kevlar®, which is embedded in a sheeting material so that the LTA apparatus is inflatable. Referring to FIG. 9, a portion of the LTA apparatus is shown with Kevlar® cable 76 coupled to the sheeting material panels 29 via reinforced adhesive tape 77. The geodesic framework 23 can be dispensed with and the entire envelope of the LTA apparatus can be made of flexible materials.

Figure 10:
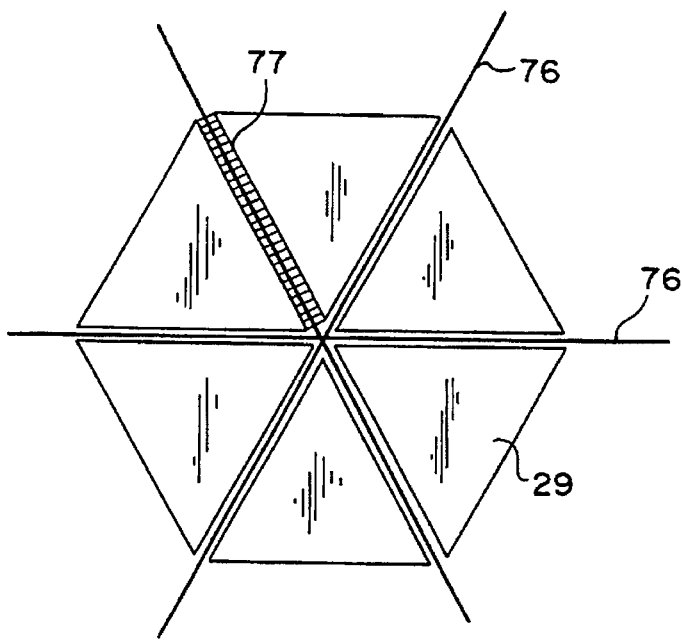
FIG. 10 shows a section of LTA panel using a tetrahex sandwich design.
Figure 13:
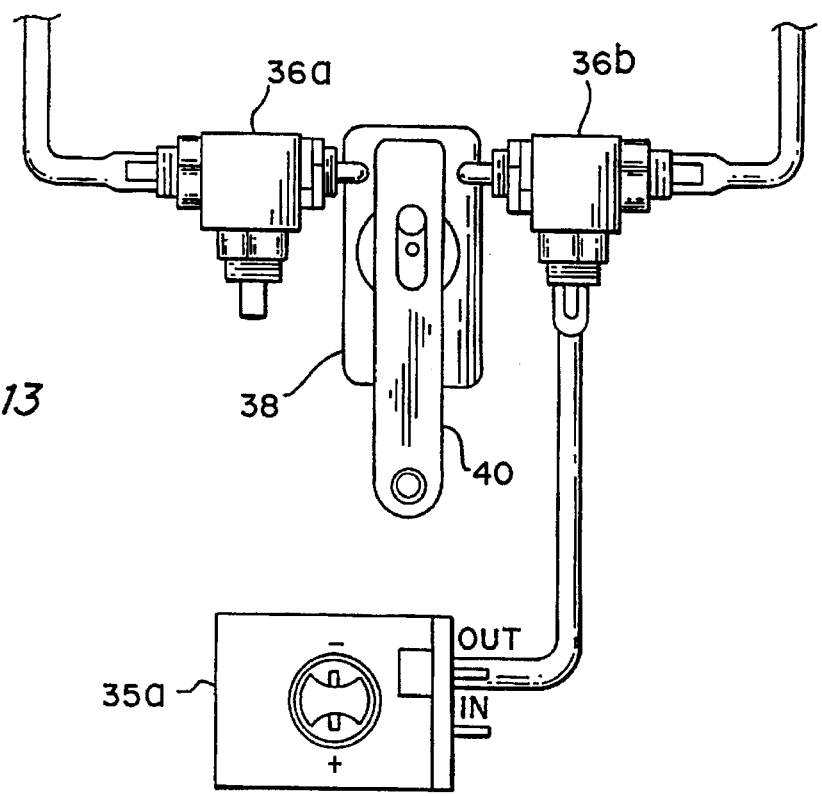
FIG. 13 shows valving arrangement.

For generating power (e.g., to operate the various components on the LTA apparatus), photovoltaic panels 71 can be attached to or replace the sheeting material panels coupled to the framework 23 (See FIG. 5) in certain environments (see below with reference to FIG. 10). If water is used in the ballast tanks of the LTA apparatus, the electricity generated by these panels 71 can be used to separate hydrogen from oxygen in order to replenish LTA gas that has leaked (the oxygen, or course, is necessarily purged from the apparatus).

Figure 15:
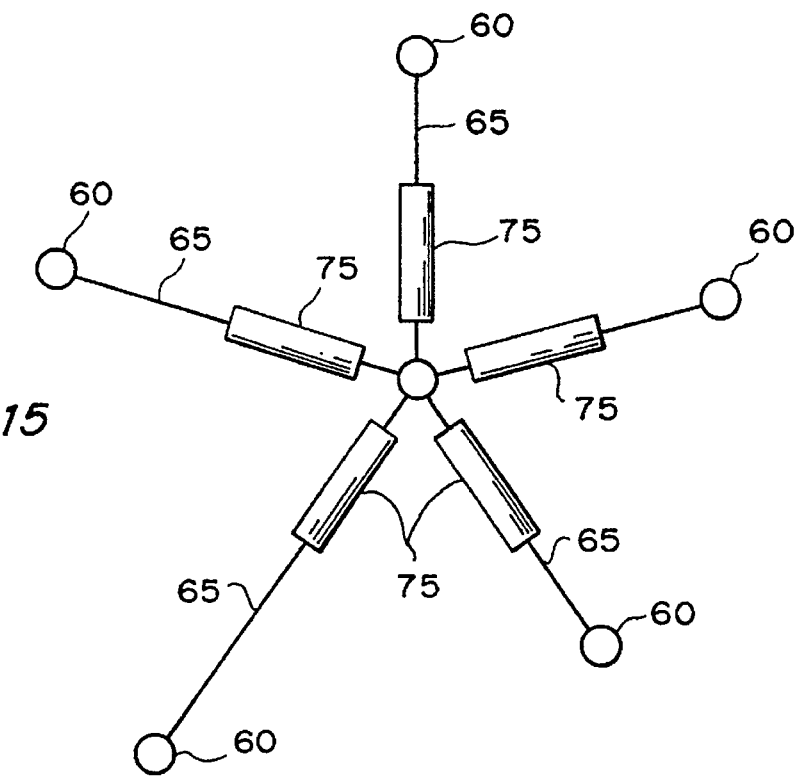
FIG. 15 is a drawing of a section of the LTA apparatus of FIG. 1 where some of the supporting struts of the geodesic framework have been replaced with actuators.
Figure 16:
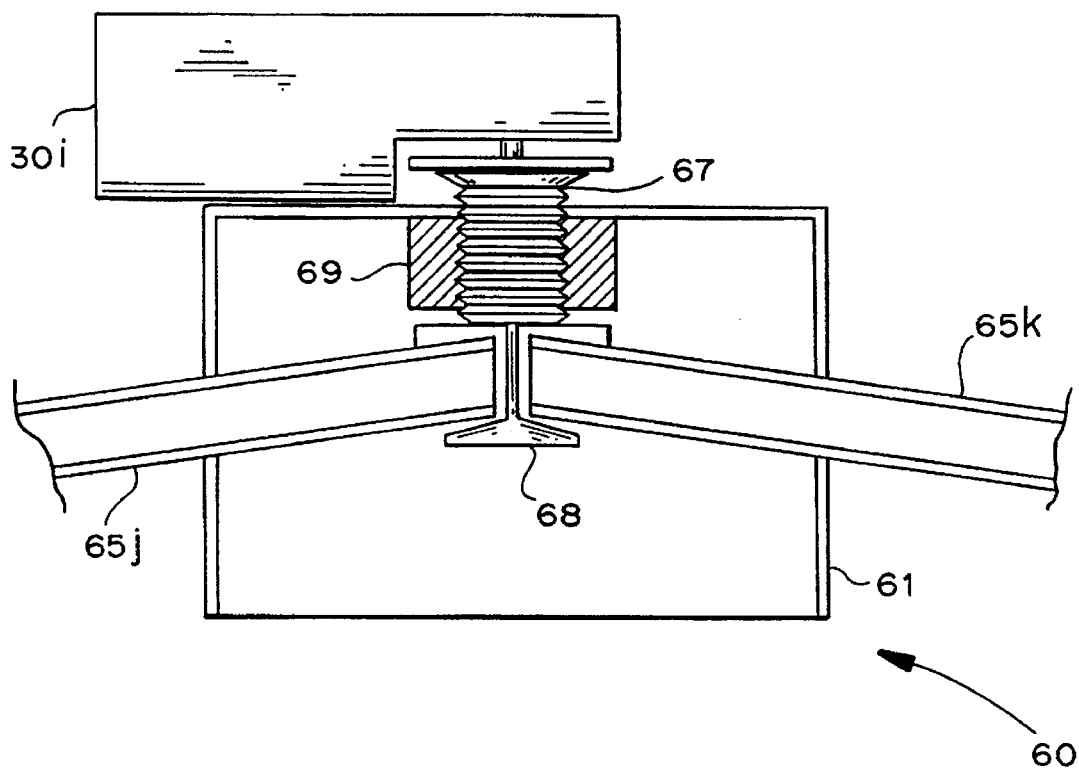
FIG. 16 is a drawing of a screw mechanism in the connector assembly.

As seen in FIG. 15, the control surfaces 25 of FIG. 2 can be replaced by a system of components in the framework 23 to deform the shape of the LTA apparatus 1. One or more of the struts of the framework are replaced with actuators 75 that are capable of lengthening and shortening a strut 65 in the framework. There are many available types of linear actuators that could be employed that are currently used in aviation devices, whether they be electrical, pneumatic or hydraulic or a combination thereof. Alternatively, as seen in FIG. 16, another way to control deformation employs a screw mechanism 61 in various connectors 60 around the LTA apparatus 1. Servo motor 30i drives a screw 67 in nut 69 which moves flange 68 in and out against struts 65j, 65k, causing deformation of the framework 23. The deformation of the shape of the LTA apparatus 1 alters the path of airflow around the sphere, thereby shifting high and low pressure spots around the LTA apparatus. The LTA apparatus will tend to move in the direction parallel to a line drawn through the high and low pressure points on the LTA apparatus (thus, negating the need for control surfaces).

A flying sphere capable of remaining aloft at tropospheric and stratospheric altitudes for extended periods of time is substantially different than vehicles known to this point. Due to the large sizes of the spheres involved in the manufacture of this embodiment, unique solutions are required that are primarily associated with construction of large diameter light weight structures.

One way to construct a large diameter vehicle is to make the geodesic design envelope out of LTA sandwich panels formed in a reduced pressure environment that is filled with a LTA gas such as helium or hydrogen. There are several benefits from utilizing such a construction method. First, the vehicle would maintain a full spherical shape during ascent, enabling the structure to withstand wind shear encountered during ascent. Second, because the panels are formed in a reduced pressure environment, the internal pressure of the LTA gas within the sandwich at deployment altitude would be equal to the external atmospheric pressure. This greatly reduces the stress on the structure and lowers the rate of gas permeability. Third, employing a honeycomb sandwich provides two film barriers for preventing escape of the sphere's interior LTA gas.

A method disclosed in U.S. Pat. No. 5,005,800 to Weisse could be utilized to form panels in a reduced pressure environment. The disclosure of U.S. Pat. No. 5,005,800 to Weisse is hereby incorporated by reference in its entirety. Referring to FIGS. 10A and 10S (which are edited versions of FIGS. 1 and 2 of Weisse, respectively), such a panel is shown. The tetrahex structure 3 is sandwiched between an outer sheeting material membrane 1a and an inner gas sheeting material membrane 4. Voids 2 in the tetrahex sandwich are filled with a LTA gas that is at a pressure lower than 1 bar. Such panels could be made to float themselves if the weight of the sandwich material per square meter is less than the lift equivalent of the enclosed LTA gas. Because the sandwich is sealed, it is possible to employ hydrogen as the enclosed gas, as it would be prevented from combusting with atmospheric oxygen. Outer sheeting material membrane 1a may support a photovoltaic panel 6 mounted on thermal insulators 5.

This method could be employed to construct smaller diameter spheres, as well. Utilizing a tetrahex LTA sandwich as the material to construct the envelope of the sphere provides several substantial advantages in solving several problems of launching and maintaining stratospheric LTA vehicles that current vehicle designs have been unable to overcome. Currently, super-pressure LTA devices are only partially inflated at ground level in order to allow for the expansion of the lifting gases as the vehicle rises through the atmosphere. The vehicle only "super-pressurizes" as it nears its deployment altitude. The problem with this approach is the wind shears the vehicle encounters during ascent prior to full inflation of the vehicle. The slack envelope material of these vehicles is buffeted by the wind and can rip or tear, resulting in failure of the vehicle.

Using the tetrahex LTA sandwich envelope avoids problems seen in constant volume balloons (CVB). CVBs that are inflated so that there is no slack in the skin at ground level suffer from the inability to either withstand the tremendous pressures created at high altitude deployment and burst, or have insufficient lift to reach stratospheric altitudes with a substantial payload.

For a LTA apparatus of the present invention to efficiently maintain a constant position with respect to the Earth, a particular region of the atmosphere is most conducive for deployment. This region is found just above the troposphere in the beginning of the stratosphere where wind velocities are at a minimum. The approximate height of this region is 23,000 feet or 21 KM. It must be understood that this region of least wind migrates which is why the present invention is provided the means to seek and follow the region of least wind. The region is also associated with the atmospheric pressure of approximately 50 milibars.

The incorporation of photovoltaic panels into or onto a stratospheric LTA vehicle is absolutely necessary for creating long term deployment of electronics packages. The electric power supplied by the photovoltaic panels is vital to the powering of both the propulsion of the vehicle and the payload electronics. Single layer envelope structures at present are unable to support photovoltaic panels on the sun-exposed surfaces. This inability is due to the extreme temperature differentials that are created by solar radiation and the resulting thermal fatigue of the envelope which results in premature failure. A tetrahex sandwich panel would be able to support photovoltaic panels on a system of insulated points that would correspond to the points at which the tetrahex internal structure contacts the sandwich skin, thereby greatly reducing the extreme temperature differentials that contribute to failure.

Another solution is to utilize the photovoltaic film as the outer layer of the tetrahex sandwich, which would replace the outer impermeable membrane 1a of FIG. 10A with a photovoltaic panel 6.

Figure 14:
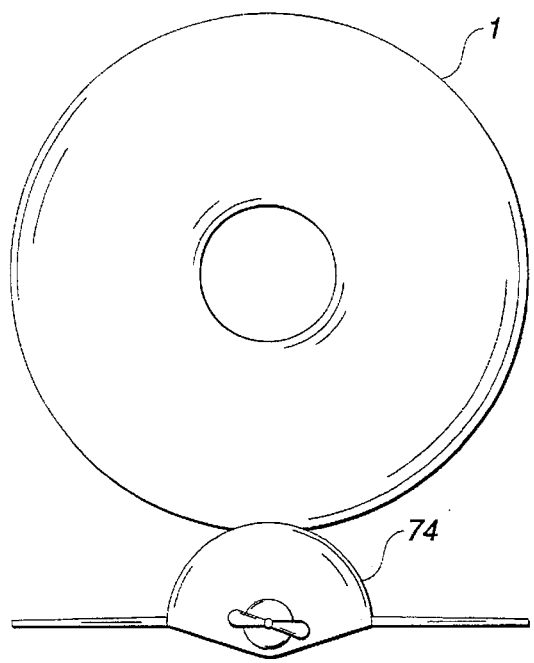
FIG. 14 is a drawing of a passenger carrying compartment coupled to the LTA apparatus of FIG. 1.

Referring to FIG. 14, an LTA apparatus is shown with a passenger carrying compartment (i.e., passenger pod 74). To create a passenger carrying flying sphere, the passenger pod 74 must safely and comfortably enclose one or more people within the LTA apparatus or in a compartment attached to the LTA apparatus.

Referring to FIG. 1, the LTA apparatus 1 may be tethered to the Earth using a tether 120. A tether limits the possibility of losing the LTA apparats. The tether can also provide power to the LTA apparats. The tether can carry communications wire for the transmittal of video images and control signals between a ground stations and the onboard electronics. An example of such a tether is currently used in surveillance blimps such as the ones used on a blimp manufactured by Teledyne of California or ILC of Delaware. With respect to power generation using photovoltaic cells, the LTA apparatus could be used to generate electric power for consumption at the ground level.

The LTA apparatus of the present invention has a variety of uses. Because of its ability to hold a constant position over the Earth's surface, the LTA apparatus can be used as a low altitude satellite, a national weather service station, or for general earth sensing. Using the propulsion unit(s), the LTA apparatus can be used for carrying passengers or freight as well as for prospecting, rain forest canopy research, and hazardous environment monitoring. The unique appearance of the LTA apparatus also lends itself to promotional and advertising purposes. Yet another useful embodiment of the present invention is a flying sphere of sufficient size that would be capable of supporting telecommunications devices, image sensing equipment, or scientific electronics equipment.

What is claimed is:

1. A substantially spherical lighter than air apparatus having a quantity of lighter than air gas disposed therein providing the lighter than air apparatus with a desired buoyancy and capable of maintaining its bearing and position relative to the Earth, comprising:

a flexible sheeting material having an outer surface of a substantially spherical shape when filled with a quantity of lighter than air gas, the sheeting material having first and second apertures in the outer surface;

a pathway coupled within the sheeting material, such that the pathway is coupled between the first and second apertures, the pathway permitting air to flow through the first and second apertures;

at least one control surface coupled proximately to one of the first and second apertures and the pathway, the control surface deflecting air passing through the pathway, such that the control surface controls the bearing of the lighter than air apparatus;

a propulsion unit coupled within the pathway, the propulsion unit propelling air through the pathway to the control surface, such that the propulsion unit controls the position of the lighter than air apparatus relative to the Earth;

an air ballast pump coupled to the lighter than air apparatus;

at least one second ballonet disposed within the sheeting material and coupled to the air ballast pump via a first valve, such that gas having a density at least that of air is pumped into the second ballonet by the air ballast pump via the first valve;

a second valve coupled to the ballonet, the second valve purging the gas in the second ballonet outside of the lighter than air apparatus;

a station keeping system coupled to the control surface, the station keeping system monitoring a position and altitude of the lighter than air apparatus relative to the Earth and controlling the control surface to maintain the position;

at least one Global Positioning System device coupled to a power source, such that a position of the lighter than air apparatus can be determined;

at least one ballast tank coupled within the sheeting material;

a pump; and line coupled between the pump and the ballast tank, such that the pump moves liquid to and from the ballast tank to change a center of gravity of the lighter than air apparatus;

wherein the station keeping system comprises:

a compass indicating a bearing of the lighter than air apparatus;

an altimeter providing a measurement of an altitude of the lighter than air apparatus;

an external anemometer coupled to an exterior of the lighter than air apparatus measuring wind velocity impinging upon the lighter than air apparatus;

an internal anemometer coupled within the pathway measuring velocity impinging upon the pathway of the lighter than air apparatus;

a wind vane measuring wind direction impinging upon the lighter than air apparatus; and a computer coupled to the control surface, propulsion unit, Global Positioning System device, pump, compass, altimeter, internal and external anemometers, and the second ballonet, the computer outputting signals to control the propulsion unit, the inflation and deflation of the ballonet, deflection of the control surface, and pumping of ballast from and to the ballast tank based upon readings from the compass and comparisons of actual values of the wind velocity, wind direction, altitude and position from the internal and external anemometers, wind vane, altimeter, and Global Position System device and preselected values of the wind velocity, wind direction, altitude, and position to maintain the lighter than air apparatus at a desired position and altitude.

2. A lighter than air apparatus having a quantity of lighter than air gas disposed therein and providing the lighter than air apparatus with a desired buoyancy and capable of maintaining its bearing and position relative to the Earth, comprising:

a sheeting material having an outer surface and at least one diameter, the sheeting material having first and second apertures in the outer surface, the outer surface of the sheeting material having a substantially spherical shape when filled with a quantity of lighter than air gas;

a pathway coupled within the sheeting material, such that the pathway is coupled between the first and second apertures, the pathway permitting air to flow through the first and second apertures, wherein a largest diameter of the sheeting material is no greater than two times a length of the pathway;

at least one control surface coupled proximately to one of the first and second apertures and the pathway, the control surface deflecting air passing through the pathway, such that the control surface controls the bearing of the lighter than air apparatus;

a propulsion unit coupled within the pathway, the propulsion unit propelling air through the pathway to the control surface, such that the propulsion unit controls the position of the lighter than air apparatus relative to the Earth;

an air ballast pump coupled to the lighter than air apparatus;

at least one second ballonet disposed within the sheeting material and coupled to the air ballast pump via a first valve, such that gas having a density at least that of air is pumped into the second ballonet by the air ballast pump via the first valve;

a second valve coupled to the second ballonet, the second valve purging the gas in the second ballonet outside of the lighter than air apparatus;

a station keeping system coupled to the control surface, the station keeping system monitoring a position and altitude of the lighter than air apparatus relative to the Earth and controlling the control surface to maintain the position;

at least one Global Positioning System device coupled to a power source, such that a position of the lighter than air apparatus can be determined;

at least one ballast tank coupled within that sheeting material;

a pump; and line coupled between the pump and the ballast tank, such that that pump moves liquid to and from the ballast tank to change a center of gravity of the lighter than air apparatus wherein the station keeping system comprises:

a compass indicating a bearing of the lighter than air apparatus;

an altimeter providing a measurement of an altitude of the lighter than air apparatus;

an external anemometer coupled to an exterior of the lighter than air apparatus measuring wind velocity impinging upon the lighter than air apparatus;

an internal anemometer coupled within the pathway measuring wind velocity impinging upon the pathway of the lighter than air apparatus;

a wind vane measuring wind direction impinging upon the lighter than air apparatus; and a computer coupled to the control surface, propulsion unit, Global Positioning System device, pump, compass, altimeter, internal and external anemometers, and the second ballonet, the computer outputting signals to control the propulsion unit, inflation and deflation of the ballonet, deflection of the control surface, and pumping of ballast from and to the ballast tank based upon readings from the compass and comparisons of actual values of the wind velocity, wind direction, altitude and position from the internal and external anemometers, wind vane, altimeter, and Global Positioning System device and preselected values of the wind velocity, wind direction, altitude, and position to maintain the lighter than air apparatus at a desired position and altitude.

3. A lighter than air apparatus having a quantity of lighter than air gas disposed therein and providing the lighter than air apparatus with a desired buoyancy and capable of maintaining its bearing and position relative to the Earth comprising:

a flexible sheeting material having an outer surface of a substantially spherical shape when filled with a quantity of lighter than air gas;

a pathway having first and second apertures coupled adjacent to the sheeting material, the pathway permitting air to flow through the first and second apertures;

at least one control surface coupled proximately to one of the first and second apertures and the pathway, the control surface deflecting air passing through the pathway, such that the control surface controls the bearing of the lighter than air apparatus;

a propulsion unit coupled within the pathway, the propulsion unit propelling air through the pathway to the control surface, such that the propulsion unit controls the position of the lighter than air apparatus relative to the Earth;

a station keeping system coupled to the control surface, the station keeping system monitoring a position and altitude of the lighter than air apparatus relative to the Earth and controlling the control surface to maintain the position;

at least one Global Positioning System device coupled to a power source, such that a position of the lighter than air apparatus can be determined;

at least one ballast tank coupled within the sheeting material;

a pump; and a line coupled between the pump and the ballast tank, such that the pump moves liquid to the ballast tank, such that the pump moves liquid to and from the ballast tank to change a center of gravity of the lighter than air apparatus wherein the station keeping system comprises:

a compass indicating a bearing of the lighter than air apparatus;

an altimeter providing measurement of an altitude of the lighter than air apparatus;

an external anemometer coupled to an exterior of the lighter than air apparatus measuring wind velocity impinging upon the lighter than air apparatus;

an internal anemometer coupled within the pathway measuring wind velocity impinging upon the pathway of the lighter than air apparatus;

a wind vane measuring wind direction impinging upon the lighter than air apparatus; and a computer coupled to the control surface, propulsion unit, Global Positioning System device, pump, compass, altimeter, internal and external anemometers, and the second ballonet, the computer outputting signals to control the propulsion unit, inflation and deflation of the ballonet, deflection of the control surface, and pumping of ballast from and to the ballast tank based upon readings from the compass and comparisons of actual values of the wind velocity, wind direction, altitude and position from the internal and external anemometers, wind vane, altimeter, and Global Positioning System device and preselected values of the wind velocity, wind direction, altitude, and position to maintain the lighter than air apparatus at a desired position and altitude.

* * * * *